(12) United States Patent
Kitayama et al.

(10) Patent No.: US 7,553,345 B2
(45) Date of Patent: *Jun. 30, 2009

(54) POLISHING COMPOSITION

(75) Inventors: Hiroaki Kitayama, Wakayama (JP); Shigeo Fujii, Wakayama (JP)

(73) Assignee: KAO Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/737,841

(22) Filed: Dec. 18, 2003

(65) Prior Publication Data

US 2004/0123527 A1 Jul. 1, 2004

(30) Foreign Application Priority Data

| Dec. 26, 2002 | (JP) | ............................... 2002-376430 |
| Dec. 26, 2002 | (JP) | ............................... 2002-376443 |
| Dec. 26, 2002 | (JP) | ............................... 2002-376456 |

(51) Int. Cl.
*C09G 1/02* (2006.01)
*C09G 1/04* (2006.01)
*B24B 1/00* (2006.01)

(52) U.S. Cl. ............................... 51/307; 51/309; 106/3; 216/96; 216/101; 216/108; 510/165; 510/167

(58) Field of Classification Search .................. 51/307, 51/309; 106/3; 216/989, 96, 101, 102, 103, 216/108; 510/165, 167; 438/692, 693
See application file for complete search history.

(56) References Cited

U.S. PATENT DOCUMENTS

| 4,752,628 | A | | 6/1988 | Payne |
| 5,700,383 | A | * | 12/1997 | Feller et al. .................. 438/645 |
| 5,997,620 | A | | 12/1999 | Kodama et al. |
| 6,224,464 | B1 | * | 5/2001 | Nojo et al. ..................... 451/41 |
| 6,258,140 | B1 | * | 7/2001 | Shemo et al. .................. 51/308 |
| 6,316,366 | B1 | * | 11/2001 | Kaufman et al. ............... 438/693 |
| 6,783,434 | B1 | * | 8/2004 | Akahori et al. ................. 451/41 |
| 6,786,945 | B2 | * | 9/2004 | Machii et al. .................. 51/307 |
| 2001/0017007 | A1 | | 8/2001 | Hagihara et al. |
| 2001/0051746 | A1 | * | 12/2001 | Hagihara et al. ............. 562/400 |
| 2002/0081949 | A1 | * | 6/2002 | Yoshida et al. ................. 451/41 |
| 2002/0102923 | A1 | | 8/2002 | Sugiyama et al. |
| 2003/0006396 | A1 | * | 1/2003 | Wang et al. .................. 252/79.1 |
| 2003/0041526 | A1 | * | 3/2003 | Fujii et al. ..................... 51/307 |
| 2003/0211743 | A1 | * | 11/2003 | Chang et al. ................. 438/692 |
| 2003/0228762 | A1 | * | 12/2003 | Moeggenborg et al. ...... 438/691 |
| 2003/0228763 | A1 | * | 12/2003 | Schroeder et al. ............ 438/691 |
| 2004/0025742 | A1 | * | 2/2004 | Kitayama et al. ............... 106/3 |
| 2004/0092103 | A1 | * | 5/2004 | Fujii et al. .................... 438/689 |
| 2004/0132385 | A1 | * | 7/2004 | Kitayama et al. .............. 451/41 |

FOREIGN PATENT DOCUMENTS

| EP | 1050568 A1 | 11/2000 |
| EP | 1333476 A2 | 8/2003 |
| GB | 2 393 186 A | 3/2004 |
| JP | 63-318257 A | 12/1988 |
| JP | 1-121163 A | 5/1989 |
| JP | 02-158684 A | 6/1990 |
| JP | 10-204416 A | 8/1998 |
| JP | 2000-192015 A | 7/2000 |
| JP | 2000-273445 A | 10/2000 |
| JP | 2000-323444 A | 11/2000 |
| JP | 2001-064632 A | 3/2001 |
| JP | 2001-085372 A | 3/2001 |
| JP | 2001-214155 A | 8/2001 |
| JP | 2002-020732 A | 1/2002 |
| JP | 2002-030273 A | 1/2002 |
| JP | 2002-030274 A | 1/2002 |
| JP | 2002-167575 A | 6/2002 |
| JP | 2002-327170 A | 11/2002 |
| WO | WO-01/23485 A1 | 4/2001 |
| WO | 02/67309 | * 2/2002 |
| WO | WO-03/072671 A1 | 9/2003 |

* cited by examiner

*Primary Examiner*—Michael A Marcheschi
(74) *Attorney, Agent, or Firm*—Birch, Stewart, Kolasch & Birch, LLP

(57) ABSTRACT

A microwaviness reducing agent for polishing a substrate for a precision part, containing either a surfactant having two or more ionic hydrophilic groups, or a polycarboxylic acid compound having 2 to 15 total carbon atoms and having either OH group or groups or SH group or groups, or a salt thereof; a polishing composition for a substrate for a precision part, containing the microwaviness reducing agent, an abrasive and water; a polishing composition comprising water, an abrasive, an organic acid or a salt thereof, and a surfactant, wherein the organic acid is a polycarboxylic acid compound having 2 to 15 total carbon atoms and having either OH group or groups or SH group or groups, and wherein the surfactant has two or more ionic hydrophilic groups in its molecule and has a molecular weight of 300 or more; a method of reducing microwaviness of a substrate for a precision part; and a method for manufacturing a substrate for a precision part.

5 Claims, No Drawings

POLISHING COMPOSITION

This Non-provisional application claims priority under 35 U.S.C. §119(a) on Patent Application No(s). 2002-376430; 2002-376443; and 2002-376456 filed in Japan on Dec. 26, 2002, respectively, the entire contents of which are hereby incorporated by reference.

FIELD OF THE INVENTION

The present invention relates to a microwaviness reducing agent for polishing a substrate for a precision part. More specifically, the present invention relates to a polishing composition containing a microwaviness reducing agent, a method of reducing microwaviness of a substrate for a precision part with the polishing composition, and a method for manufacturing a substrate with the polishing composition.

In addition, the present invention relates to a polishing composition which is capable of reducing waviness or nodules on a substrate to be polished. Further, the present invention relates to a method of reducing waviness and/or nodules of a substrate to be polished with the polishing composition and a method for manufacturing a substrate with the above polishing composition.

BACKGROUND OF THE INVENTION

It has been desired in a hard disk to lower a flying height of a magnetic head in order to advance in the reduction in the unit recording area and increase in storage capacity. In order to lower the flying height of the head, there have strongly urged the reduction in surface roughness in the polishing step of a substrate for a hard disk, as well as the reduction in microwaviness (microwaviness being referred to as projections and dents on the surface having a longer wavelength than the surface roughness, which is referred herein to the waviness having a wavelength of from 0.5 to 5 mm), a wide range of waviness including this microwaviness [short wavelength waviness (waviness having a wavelength of from 50 to 500 μm), and long wavelength waviness (waviness having a wavelength of 0.5 mm or more)], and furthermore the reduction in expansion due to nodules (hereinafter simply referred to as nodules). In order to manufacture a substrate with reduced microwaviness and further reduced waviness and nodules, studies have been made on a multi-stage polishing in which polishing is carried out step-by-step with gradually reducing a particle size of an abrasive, and on mechanical conditions such as controlling a pore diameter of a polishing pad, hardening the hardness of the polishing pad, and controlling a polishing load and the number of rotations. However, in the formation of finer particles for the abrasive, the processing time can take a long period of time, so that the waviness cannot be reduced to the desired microwaviness in the mechanical conditions. In addition, studies have been made on a process of polishing with a polishing composition containing a water-soluble iron compound (for instance, see Japanese Patent Laid-Open No. Hei 10-204416). However, in this process, the microwaviness, and further waviness and nodules cannot said to be satisfactorily reduced.

SUMMARY OF THE INVENTION

The present invention relates to:
[1] a microwaviness reducing agent for polishing a substrate for a precision part, comprising a surfactant having two or more ionic hydrophilic groups;

[2] a microwaviness reducing agent for polishing a substrate for a precision part, comprising a polycarboxylic acid compound having 2 to 15 total carbon atoms and having either OH group or groups or SH group or groups, or a salt thereof;

[3] a polishing composition for a substrate for a precision part, comprising the microwaviness reducing agent as defined in the above [1], an abrasive and water;

[4] a polishing composition for a substrate for a precision part, comprising the microwaviness reducing agent as defined in the above [2], an abrasive and water;

[5] a polishing composition comprising water, an abrasive, an organic acid or a salt thereof, and a surfactant, wherein the organic acid is a polycarboxylic acid compound having 2 to 15 total carbon atoms and having either OH group or groups or SH group or groups, and wherein the surfactant has two or more ionic hydrophilic groups in its molecule and has a molecular weight of 300 or more;

[6] a method of reducing microwaviness of a substrate for a precision part, comprising the step of applying the polishing composition as defined in the above [3] to a substrate to be polished;

[7] a method of reducing microwaviness of a substrate for a precision part, comprising the step of applying the polishing composition as defined in the above [4] to a substrate to be polished;

[8] a method of reducing waviness and/or nodules of a substrate to be polished, comprising the step of polishing the substrate to be polished with the polishing composition as defined in the above [5];

[9] a method for manufacturing a substrate for a precision part, comprising the step of polishing a substrate to be polished with the polishing composition as defined in the above [3];

[10] a method for manufacturing a substrate for a precision part, comprising the step of polishing a substrate to be polished with the polishing composition as defined in the above [4]; and

[11] a method for manufacturing a substrate for a precision part, comprising the step of polishing a substrate to be polished with the polishing composition as defined in the above [5].

DETAILED DESCRIPTION OF THE INVENTION

All publications cited herein are hereby incorporated by reference.

The present invention relates to a microwaviness reducing agent capable of efficiently reducing microwaviness of a substrate, a polishing composition containing the microwaviness reducing agent, a method of reducing microwaviness of a substrate for a precision part with the polishing composition, and a method for manufacturing a substrate with the above polishing composition.

In addition, the present invention relates to a polishing composition capable of reducing waviness and/or nodules of a substrate to be polished, a method of reducing waviness and/or nodules of a substrate to be polished with the polishing composition, and a method for manufacturing a substrate with the above polishing composition.

1. Microwaviness Reducing Agent

The microwaviness reducing agent of the present invention is roughly classified into the following two embodiments:
(Embodiment 1) a surfactant having two or more ionic hydrophilic groups;

(Embodiment 2) a polycarboxylic acid having 2 to 15 total carbon atoms and having either OH group or groups or SH group or groups or a salt thereof.

A great feature of the microwaviness reducing agent of the present invention resides in that the microwaviness reducing agent contains the above-mentioned compound. By polishing with the microwaviness reducing agent having the above features, there are exhibited some remarkable effects that the microwaviness of a substrate to be polished such as a substrate for a precision part can be sufficiently reduced, so that a substrate capable of increasing its memory capacity per unit area can be manufactured.

The microwaviness as referred to herein is an average waviness (Wa) at a waviness wavelength of from 0.5 to 5 mm, wherein the Wa is determined by non-contact-type three-dimensional surface structural analytic microscope (commercially available from Canon Sales, Inc. under the trade name of ZygoNew-View 200). Furthermore, concretely, measurements are taken with Michelson lens with magnification of 2.5 as an objective lens, zooming ratio of 0.5, resolution of 320×240, with approximate processing with Cylinder, and processing through a band pass filter which is "FFT FIXED" in a range of from 0.5 to 5 mm.

The substrate for a precision part as the object of the present invention, for instance, is suitable for polishing a substrate for magnetic recording media such as magnetic disk, optical disk, or optical magnetic disk, photomask substrate, optical lens, optical mirror, optical prism, semiconductor substrate, or the like. The semiconductor substrate includes a substrate containing a silicon wafer (bare wafer), a film for shallow trench isolation, interlayer dielectric, embedded metal line, embedded capacitor, and the like.

The material of the substrate for a precision part that is a substrate to be polished includes, for instance, metals or metalloids such as silicon, aluminum, nickel, tungsten, copper, tantalum and titanium; alloys made of these metals as main components; glassy substances such as glass, glassy carbon and amorphous carbons; ceramic materials such as alumina, silicon dioxide, silicon nitride, tantalum nitride and titanium nitride; resins such as polyimide resins; and the like. Among them, it is preferable that an object to be polished is made of a metal such as aluminum, nickel, tungsten or copper, or made of an alloy containing these metals as the main components; or an object to be polished is a semiconductor substrate made of semiconductor elements containing these metals. Even more preferably, the substrate for a precision part such as magnetic disk substrate having surface made of metal is suitably used, furthermore, a substrate of which surface has a layer made of Ni-P alloy, such as Ni-P plated aluminum alloy or glass substrate, is preferable, a substrate for a hard disk is even more preferable. Even more preferably, the microwaviness reducing agent of the present invention is suitably used for polishing with alumina particles in the polishing of Ni-P plated substrate.

The shape of the object to be polished is not particularly limited. For instance, those having shapes containing planar portions such as discs, plates, slabs and prisms, or shapes containing curved portions such as lenses can be subjects for polishing with the polishing composition of the present invention. Among them, those having the disc-shaped objects are even more preferable in polishing.

[Microwaviness Reducing Agent of Embodiment 1]

Among the above-mentioned microwaviness reducing agents, the surfactant of the embodiment 1 is a water-soluble surfactant acting on an interface of a dispersant such as a polishing composition or a polishing debris, and having an action of increasing dispersibility of a dispersant to a dispersion medium. The details of the function mechanisms for reducing the microwaviness by the surfactant having two or more ionic hydrophilic groups of the present invention are not elucidated. Although not wanting to limited by theory, the details may be presumably as follows. Specifically, since the surfactant having two or more ionic hydrophilic groups has a high dispersibility, in other words, even more preferably having an ability of suppressing strong aggregation of the polishing debris, thereby remarkably reducing polishing at a dent portion of the substrate surface for a precision part, consequently, selective polishing at a projection portion is more accelerated, so that the microwaviness of the substrate can be reduced.

Even more preferably, in the Ni-P plated substrate surface made of an aluminum alloy, since the microwaviness reducing agent has an excellent ability of reducing a projection generated in a plating step, called as a nodule, or a dent caused by scratches, and the like, owned by the aluminum alloy substrate before Ni-P plating, and the effect of reducing the microwaviness is high, so that the microwaviness reducing agent also has a function as a nodule reducing agent.

The number of the ionic hydrophilic groups of the surfactant used as the microwaviness reducing agent of the embodiment 1 is 2 or more, preferably 10 or more, from the viewpoint of reducing the microwaviness. The number of ionic hydrophilic groups of the surfactant is preferably 300 or less, from the viewpoint of preventing instability caused by the interactions between the particles (caused by cross-linking between dispersants, and the like). The number of the ionic hydrophilic groups is preferably from 10 to 2000, more preferably from 20 to 1500, even more preferably from 20 to 1000.

The kind of ionic hydrophilic groups includes anionic groups represented by carboxylate group, sulfonate group, sulfuric ester group, phosphoric ester group, phosphonate group, and the like, and cationic groups represented by quaternary ammonium salts. Among them, the microwaviness reducing agents having an anionic group as a hydrophilic group are preferable, more preferably the microwaviness reducing agents having carboxylate group, from the viewpoint of reducing the microwaviness. Among them, the microwaviness reducing agents having two or more carboxylate groups are even more preferable, from the viewpoint of reducing the waviness.

The molecular weight of the surfactant is preferably 300 or more, more preferably from 300 to 1000000, even more preferably from 500 to 500000, even more preferably from 1000 to 100000, even more preferably from 1000 to 50000, from the viewpoint of reducing the waviness. The molecular weight refers to a weight-average molecular weight calculated as polystyrenesulfonic acid as determined by gel permeation chromatography, when the surfactant is a polymerized compound or a polymer.

Concrete examples of the surfactant of the embodiment 1 are as follows. Here, those within quotation marks each indicate trade names.

Examples of the surfactant of which hydrophilic group is an anionic group include alkyl polycarboxylic acid or a salt thereof, representatively exemplified by potassium alkenylsuccinate having 14 to 30 carbon atoms, and spiculisporic acid; (meth)acrylic acid polymers, copolymers thereof, and salts thereof, representatively exemplified by "UC3120" (commercially available from TOAGOSEI CO., LTD.), "Poise 521" (commercially available from Kao Corporation), "Aron A6016" (commercially available from TOAGOSEI CO., LTD.), and "FC-900" (commercially available from NIPPON SHOKUBAI CO., LTD.); maleic acid polymers, copolymers thereof, and salts thereof, representatively exemplified by DEMOL ST" (commercially available from Kao Corporation), and "DEMOL EP" (commercially available from Kao Corporation); itaconic acid polymers, copolymers thereof, and salts thereof, representatively exemplified by copolymers of vinyl acetate and itaconic acid, copolymers of acrylic acid and itaconic acid; polynaphthalenesulfonic acid or salt thereof, representatively exemplified by "DEMOL N" (commercially available from Kao Corporation), and "DEMOL AS" (commercially available from Kao Corporation); polymelaminesulfonic acids or salts thereof, representatively exemplified by "Melflow" (commercially available from MITSUI CHEMICALS, INC.), sulfonated styrene polymer, copolymers thereof and salts thereof; polysaccharides, derivatives thereof and salts thereof, representatively exemplified by sodium alginate and carboxymethyl cellulose; polyvinyl alcohols modified with an anionic hydrophilic group monomer, represented by "KL318" (commercially available from KURARAY CO., LTD.) and "SS2217" (commercially available from KURARAY CO., LTD.); and the like. Examples of the surfactant of which hydrophilic group is a cationic group include polymers of quaternary ammonium monomers, copolymers thereof and salt thereof, the constituting monomers of which are representatively exemplified by "Merquat-100" (commercially available from MATSUMOTO TRADING CO., LTD.), "Merquat-550" (commercially available from MATSUMOTO TRADING CO., LTD.), and "Merquat-280" (commercially available from MATSUMOTO TRADING CO., LTD.); (trimethylammonium chloride) ethyl (meth)acrylate polymers, copolymers and salts thereof; polyvinyl alcohols modified with a cationic hydrophilic monomer, representatively exemplified by "C-506" (commercially available from KURARAY CO., LTD.) and "CM-308" (commercially available from KURARAY CO., LTD.); and the like.

Among them, the alkyl polycarboxylic acids and the polymers of carboxylic acid monomers, such as (meth)acrylic acid, maleic acid or itaconic acid, copolymers with a monomer copolymerizable with the carboxylic acid monomer, and salts thereof are preferable, more preferably a polymer of a compound having an α,β-dicarboxylic acid unit, such as an alkenylsuccinic acid; a copolymer of maleic acid, a copolymer of itaconic acid, a copolymer with another compound copolymerizable with the compound, and a salt thereof. Even more preferable are the polymer of maleic acid, a copolymer thereof, and a salt thereof. Among these preferred compounds, although the kind of monomers used in copolymerization is not limited, concrete examples of the monomers include olefinic hydrocarbons, (meth)acrylic acid, (meth)acrylic esters, (meth)acrylic acid amides, polyalkylene oxide alkylene ethers, vinyl esters of an organic acid, and the like.

In addition, the counter ions in the case where a salt of the surfactant having these anionic groups are not particularly limited. Concrete examples include salts with a metal, ammonium, an alkylammonium, an organic amine, and the like. Concrete examples of the metals include metals belonging to the Group 1A, 1B, 2A, 2B, 3A, 3B, 4A, 6A, 7A or 8 of the Periodic Table (long period form). Among these metals, those metals belonging to Group 1A, 3B, or 8 are preferable, and sodium and potassium belonging to Group 1A are even more preferable, from the viewpoint of reducing the microwaviness and from the viewpoint of reducing waviness and nodules.

Concrete examples of the alkylammonium include tetramethylammonium, tetraethylammonium, tetrabutylammonium, and the like.

Concrete examples of the organic amine include dimethylamine, trimethylamine, alkanolamines, and the like.

Among these salts, ammonium salts, sodium salts and potassium salts are even more preferable.

[Microwaviness Reducing Agent of Embodiment 2]

The details of the function mechanisms for reducing the microwaviness by the polycarboxylic acids having 2 to 15 total carbon atoms and having either OH group or groups or SH group or groups and salt thereof in the embodiment 2 are not elucidated. Although not wanting to be limited by theory, the details may be presumably as follows. Specifically, since the polycarboxylic acid having 2 to 15 total carbon atoms and having either OH group or groups or SH group or groups and/or a salt thereof is formulated in the polishing composition, the compound adsorbs to the abrasive and polishing debris during polishing, so that a negative surface potential is increased, thereby improving the dispersibility, and suppressing the aggregation of the abrasive. Consequently, polishing at the dent portions of the surface of a substrate for a precision part is markedly reduced by the aggregated particles, so that selective polishing at the projection portions is more accelerated, whereby the microwaviness of the substrate can be reduced.

Even more preferably, in an Ni-P plated substrate surface made of aluminum alloy, since the microwaviness reducing agent has an excellent ability of removing a projection generated in a plating step, so-called as a nodule, or a dent caused by scratches, and the like, owned by the aluminum alloy substrate before Ni-P plating, the effect of reducing the microwaviness is high. Therefore, the microwaviness reducing agent of the embodiment 2 also has the same function of a nodule reducing agent like in the microwaviness reducing agent of the embodiment 1.

In addition, the total number of carbon atoms of the polycarboxylic acid and the salt thereof having 2 to 15 total carbon atoms and having either OH group or groups or SH group or groups usable as the microwaviness reducing agent in the embodiment 2 is from 2 to 15, preferably from 2 to 10, more preferably from 2 to 8, even more preferably from 2 to 6, from the viewpoint of the water solubility. Among them, α-hydroxycarboxylic acid and a salt thereof are preferable, from the viewpoint of reducing the microwaviness, from the viewpoint of reducing waviness and nodules, and from the viewpoint of availability.

Concrete examples of the polycarboxylic acid having 2 to 15 total carbon atoms and having either OH group or groups or SH group or groups include malic acid, tartaric acid, citric acid, isocitric acid, allocitric acid, tartronic acid, mandelic acid, mercaptosuccinic acid, and the like. Among them, malic acid, tartaric acid, citric acid, isocitric acid, allocitric acid and tartronic acid are preferable, malic acid, tartaric acid and citric acid are even more preferable, and citric acid is even more preferable.

The salts of these polycarboxylic acids are not particularly limited. Concretely, there are included salts with a metal, ammonium, an alkylammonium, an organic amine, and the like. Concrete examples of the metals include metals belonging to the Group 1A, 1B, 2A, 2B, 3A, 3B, 4A, 6A, 7A or 8 of the Periodic Table (long period form). Among these metals, those metals belonging to Group 1A, 3B, or 8 are preferable, and sodium and potassium belonging to Group 1A are even more preferable, from the viewpoint of reducing microwaviness and from the viewpoint of reducing waviness and nodules.

Concrete examples of the alkylammonium include tetramethylammonium, tetraethylammonium, tetrabutylammonium, and the like.

Concrete examples of the organic amine include dimethylamine, trimethylamine, alkanolamines, and the like.

Among these salts, ammonium salts, sodium salts and potassium salts are even more preferable.

These microwaviness reducing agents of the embodiment 1 and embodiment 2 may be used alone or in admixture two or more kinds.

2. Polishing Composition

The polishing composition of the present invention contains the above-mentioned microwaviness reducing agent of the embodiment 1 or 2, an abrasive and water.

The content of the microwaviness reducing agent of the embodiment 1 is preferably 0.0001% by weight or more of the polishing composition of the present invention, from the viewpoint of reducing the microwaviness and further from the viewpoint of reducing waviness, and the content is preferably 5% by weight or less of the polishing composition of the present invention, from the viewpoint of foamability. The content is more preferably from 0.0005 to 3% by weight, even more preferably from 0.001 to 1.5% by weight, even more preferably from 0.005 to 0.5% by weight.

In addition, the content of the microwaviness reducing agent of embodiment 2 is preferably 0.01% by weight or more of the polishing composition of the present invention, from the viewpoint of reducing the microwaviness, and the content is preferably 15% by weight or less of the polishing composition of the present invention, from the viewpoint of easy handling. From the both viewpoints, the above-mentioned content is more preferably from 0.05 to 10% by weight, even more preferably from 0.1 to 8% by weight.

In the polishing composition of the present invention, the above-mentioned microwaviness reducing agents of the embodiment 1 and the embodiment 2 can be used together, whereby there is an advantage that the microwaviness can be even more effectively reduced.

Even more preferably, it is preferable that the polishing composition is a polishing composition containing water, an abrasive, an organic acid or a salt thereof, and a surfactant, wherein the organic acid is a polycarboxylic acid having 2 to 15 total carbon atoms and having either OH group or groups or SH group or groups, and wherein the surfactant has two or more ionic hydrophilic groups in its molecule and has a molecular weight of 300 or more, from the viewpoint of exhibiting the remarkable effects that waviness and nodules of a substrate to be polished can be significantly reduced, so that a substrate having increased memory capacity per unit area can be manufactured.

The details for the function mechanisms for reducing waviness and nodules with the polishing composition are not elucidated. Although not wanting to be limited by theory, the details may be presumably as follows. Specifically, since the above-mentioned organic acid or a salt thereof and the above-mentioned surfactant are used together, the aggregation of the abrasive is markedly suppressed. Therefore, polishing at dent portions by the aggregated coarse abrasives is suppressed, and consequently, selective polishing at projection portions is more accelerated, so that the waviness and nodules can be reduced.

When the above-mentioned microwaviness reducing agents of the embodiment 1 and 2 are used together, the combinations of each compound are not particularly limited. From the viewpoint of reducing the microwaviness, and from the viewpoint of reducing waviness and nodules, it is preferable that the microwaviness reducing agent of the embodiment 1 is one or more compounds selected from the group consisting of alkyl polycarboxylic acids, polymers of a carboxylic acid monomer, such as (meth)acrylic acid, maleic acid or itaconic acid, copolymers of the carboxylic acid monomer with a monomer copolymerizable therewith, and a salt thereof, and that the microwaviness reducing agent of the embodiment 2 is an α-hydroxycarboxylic acid.

Among them, it is more preferable that the microwaviness reducing agent of the embodiment 1 is a polymer of a compound having an α,β-dicarboxylic acid unit, such as alkenylsuccinic acid, a copolymer of maleic acid, a copolymer of itaconic acid, a copolymer of the compound with a compound copolymerizable therewith, and a salt thereof, and that the microwaviness reducing agent of the embodiment 2 is malic acid, tartaric acid, citric acid, isocitric acid, allocitric acid, tartronic acid, mandelic acid or mercaptosuccinic acid, even more preferably malic acid, tartaric acid and citric acid, even more preferably citric acid.

The content of the microwaviness reducing agents of the embodiment 1 and the embodiment 2 of the polishing composition may be the same as those defined above.

In addition, as the abrasive usable in the present invention, an abrasive generally used for polishing can be used. Examples of the abrasives include metals; carbides of metals or metalloids, nitrides of metals or metalloids, oxides of metals or metalloids, borides of metals or metalloids, diamond, and the like. The metals or metalloids include those elements belonging to the Group 2A, 2B, 3A, 3B, 4A, 4B, 5A, 6A, 7A or 8 of the Periodic Table (long period form). Concrete examples of the abrasive include a-alumina particles, intermediate alumina particles, silicon carbide particles, diamond particles, magnesium oxide particles, zinc oxide particles, cerium oxide particles, zirconium oxide particles, colloidal silica particles, fumed silica particles, and the like. It is preferable to use one or more kinds of these abrasives, from the viewpoint of increasing the polishing rate. Also, these abrasives may be used in admixture of two or more kinds depending upon the polishing properties to be required. As to the abrasives depending upon their applications, the alumina particles and the silica particles are preferred for polishing an Ni-P plated substrate, from the viewpoints of increasing the polishing rate and preventing the surface defects. Even more preferably, in the case of the alumina particles, the alumina having purity of 95% or more is preferable, from the viewpoints of reducing the microwaviness, reducing the surface roughness, increasing the polishing rate, and preventing the surface defects. It is more preferable that the alumina particles have crystal forms such as α-alumina particles, γ-alumina particles, δ-alumina particles, θ-alumina particles, η-alumina particles and κ-alumina particles, even more preferably α-alumina particles, γ-alumina particles, δ-alumina particles and θ-alumina particles, even more preferably α-alumina particles and θ-alumina particles, even more preferably a combination of α-alumina particles and θ-alumina particles. In addition, cerium oxide particles and alumina particles are preferred for polishing glassy materials. Cerium oxide particles, alumina particles and silica particles are preferred for polishing semiconductor wafer, semiconductor element or the like.

The average primary particle size of the abrasive is preferably from 0.001 to 3 μm, from the viewpoint of reducing the microwaviness. When the primary particles are aggregated to form a secondary particle, the average secondary particle size is preferably from 0.01 to 3 μm, from the viewpoint of reducing the microwaviness in the same manner as above. Even more preferably when the abrasive is alumina particles, the average primary particle size is more preferably from 0.005 to 0.8 μm, even more preferably from 0.01 to 0.5 μm, and the average secondary particle size is more preferably 0.05 to 2

μm, even more preferably from 0.1 to 1.5 μm, even more preferably from 0.1 to 0.5 μm. In addition, when the abrasive is silica particles, the average primary particle size is more preferably from 0.01 to 0.2 μm, even more preferably from 0.02 to 0.1 μm, and the average secondary particle size is more preferably from 0.03 to 2 μm, even more preferably from 0.1 to 1.2 μm. The average primary particle size of the abrasive is obtained by subjecting the abrasive to an image analysis by observing with a scanning electron microscope (favorably from 3000 to 30000 times) or a transmission electron microscope (favorably from 10000 to 300000 times), and determining the particle size. In addition, the average secondary particle size can be determined as volume-average particle size by using a laser diffraction method.

The specific gravity of the abrasive is preferably from 2 to 6, more preferably from 2 to 5, from the viewpoints of the dispersibility, the feed ability to the polishing device and the collection for reuse.

The content of the abrasive is preferably from 1 to 40% by weight, more preferably from 2 to 30% by weight, even more preferably from 3 to 25% by weight, of the polishing composition, from the viewpoints of reducing the microwaviness and having economic advantages.

Water in the polishing composition of the present invention is used as a medium, and the content of water is preferably from 55 to 98.5% by weight, more preferably from 60 to 97% by weight, even more preferably from 70 to 95% by weight, from the viewpoint of efficiently polishing the object to be polished.

In addition, there can be added other component to the polishing composition of the present invention as occasion demands. The other component includes a surfactant other than the microwaviness reducing agent of the embodiment 1, an organic acid or a salt thereof other than the microwaviness reducing agent of the embodiment 2, an inorganic acid or a salt thereof, an oxidizing agent, a thickener, an anticorrosive agent, a basic substance, and the like.

The surfactant other than the above-mentioned microwaviness reducing agent of the embodiment 1 includes a nonionic surfactant, and the like.

The preferred examples of organic acids other than the above-mentioned microwaviness reducing agent of the embodiment 2 include monocarboxylic acids represented by formic acid, acetic acid, octanoic acid, glycolic acid, glycine, and the like; dicarboxylic acids represented by succinic acid, maleic acid, fumaric acid, glutaric acid, adipic acid, citraconic acid, itaconic acid, and the like; tricarballylic acid, nitrilotriacetic acid, ethylenediaminetetraacetic acid, tricarboxylic or higher polycarboxylic acids, aminocarboxylic acids, amino acids, and the like, in order to even more efficiently reduce the microwaviness. Among them, itaconic acid, maleic acid and fumaric acid are more preferable, even more preferably itaconic acid, from the viewpoint of reducing the microwaviness. These organic acid components may be used alone or in admixture of two or more kinds. In addition, the salts of these organic acids include the same counter ions as those usable in the above-mentioned microwaviness reducing agent of the embodiment 2.

In addition, concrete examples of the inorganic acid or a salt thereof, and the oxidizing agent include those listed in Japanese Patent Laid-Open No. Sho 62-25187, page 2, upper right column, lines 3 to 11; Japanese Patent Laid-Open No. Sho 63-251163, page 2, lower left column, lines 7 to 14; Japanese Patent Laid-Open No. Hei 1-205973, page 3, upper left column, line 11 to upper right column, line 2; Japanese Patent Laid-Open No. Hei 3-115383, page 2, lower right column, line 16 to page 3, upper left column, line 11; Japanese Patent Laid-Open No. Hei 4-275387, page 2, right column, line 27 to page 3, left column, line 12, the entire contents of which are incorporated herein by reference, and the like.

Even more preferably, the polishing composition of the present invention exhibits a larger effect of reducing the microwaviness when the polishing composition contains an inorganic acid or a salt thereof as the other component. More specifically, it is preferable that the polishing composition contains a polyvalent inorganic acid or a salt thereof which generally tends to aggregate and precipitate a dispersant, and a sulfur-containing inorganic acid or a salt thereof, represented by sulfuric acid, ammonium sulfate, potassium sulfate, nickel sulfate, aluminum sulfate, aluminum sulfite, ammonium sulfamate and the like, because the effect of reducing the microwaviness is increased.

In addition, it is preferable that the organic acid or a salt thereof other than the microwaviness reducing agent of the above-mentioned embodiment 2 is added to the polishing composition, from the viewpoint of increasing the polishing rate, and also that the inorganic acid or a salt thereof is added to the polishing composition, from the viewpoint of reducing roll-off.

From the viewpoint of exhibiting each of the functions, these other components may be used alone or in admixture of two or more kinds.

In addition, the content of these other components is preferably from 0.001 to 20% by weight, more preferably from 0.005 to 15% by weight, even more preferably from 0.01 to 10% by weight, of the polishing composition, from the viewpoint of exhibiting each of the functions, and from the viewpoint of economic advantages.

Among them, when the microwaviness reducing agent of the embodiment 1 is used, the content of other components is preferably from 0.05 to 20% by weight, more preferably from 0.05 to 15% by weight, even more preferably from 0.05 to 10% by weight, even more preferably from 0.05 to 5% by weight, of the polishing composition, from the same viewpoints as those mentioned above.

In addition, as other components, a disinfectant, an antibacterial agent or the like can be formulated as occasion demands. The content of these disinfectant and antibacterial agent is preferably from 0.0001 to 0.1% by weight, more preferably from 0.001 to 0.05% by weight, even more preferably from 0.002 to 0.02% by weight, of the polishing composition, from the viewpoint of exhibiting the disinfecting function and antibacterial function, and from the viewpoints of influences to the polishing performances and economic advantages.

The concentration of each component of the polishing composition of the present invention is a preferable concentration during polishing, and the concentration may be a concentration during the preparation of the composition. The polishing composition is usually prepared as a concentrate, and the concentrate is diluted upon use in many cases.

The polishing composition can be prepared by adding and mixing the above-mentioned microwaviness reducing agent of the embodiment 1 and/or the embodiment 2, an abrasive, water and the other components by an arbitrary method.

It is preferable that the pH of the polishing composition is appropriately determined depending upon the kinds of objects to be polished and required properties. For instance, it is preferable that the pH of the polishing composition is preferably from 2 to 12, from the viewpoints of the cleanability of the objects to be polished, the anti-corrosiveness of the working machine, and the safety of the operator. In addition, in a case where the object to be polished is a substrate for a precision part which is mainly made of a metal such as an Ni-P plated aluminum alloy substrate, the pH is preferably from 2 to 10, more preferably from 2 to 9, even more preferably from 2 to 7, even more preferably from 2 to 5, of the polishing composition, from the viewpoints of increasing polishing rate and improving surface qualities. Furthermore, in a case where the polishing composition is used for polishing a semiconductor wafer, a semiconductor element, or the like, even more preferable for polishing a silicon substrate, a poly-silicon film, an $SiO_2$ film, or the like, the pH is preferably from 7 to 12, more preferably from 8 to 11, even more preferably from 9 to 11, from the viewpoints of increasing the polishing rate and improving the surface qualities. The pH can be adjusted by properly adding an inorganic acid such as nitric acid or sulfuric acid, an organic acid such as a hydroxycarboxylic acid, a polycarboxylic acid, an aminopolycarboxylic acid, or an amino acid, a metal salt or an ammonium salt thereof, or a basic substance such as aqueous ammonia, sodium hydroxide, potassium hydroxide or amine in a desired amount as occasion demands.

3. Method for Manufacturing Substrate

The method for manufacturing a substrate of the present invention includes the step of polishing a substrate to be polished with the above-mentioned polishing composition.

The material for an object to be polished as representatively exemplified by a substrate to be polished is not particularly limited, as long as the material is those generally used as a substrate for a precision part. The material includes, for instance, those mentioned above.

As the polishing process for a substrate to be polished with the polishing composition, a known method may usually be used. For instance, the substrate having reduced microwaviness can be manufactured by setting a substrate with polishing platens to which a porous polishing pad made of an organic polymer is attached, feeding the polishing composition of the present invention to a substrate surface, and moving the polishing platens and the substrate, with applying a pressure. Therefore, the present invention also relates to a method of reducing microwaviness with the polishing composition.

Even more preferably, in the polishing of a substrate made of an Ni-P plated aluminum alloy, the polishing composition containing both of the microwaviness reducing agents of the embodiment 1 and the embodiment 2, even more preferably a case where the microwaviness reducing agent of the embodiment 1 is a polycarboxylic acid having 2 to 15 total carbon atoms and having either OH group or groups or SH group or groups, and the microwaviness reducing agent of the embodiment 2 is a surfactant having two or more ionic hydrophilic groups, and having a molecular weight of 300 or more, is preferable, because the waviness and nodules can be remarkably efficiently reduced. Therefore, the present invention also relates to a method of reducing waviness and/or nodules of the above-mentioned substrate.

In addition, the method for manufacturing a substrate of the present invention even more preferably has an effect in a polishing step using a polishing pad, and the method can be applied in the same manner to a lapping step or the like which does not use a polishing pad.

EXAMPLES

The following examples further describe and demonstrate embodiments of the present invention. The examples are given solely for the purposes of illustration and are not to be construed as limitations of the present invention.

Examples I-1 to I-7 and Comparative Examples I-1 to I-2

[Method for Formulating Polishing Composition]

Formulation Method I-1

There were mixed together 16 parts by weight of an abrasive (α-alumina (alumina purity: about 99.9%) having primary average particle size: 0.23 μm, and secondary average particle size: 0.45 μm), 4 parts by weight of intermediate alumina (θ-alumina, average particle size: 0.2 μm, specific surface area: 150 m$^2$/g, alumina purity: about 99.9%), 0.5 parts by weight of itaconic acid, 3 parts by weight of citric acid, a given amount of a microwaviness reducing agent shown in Table 1, and balance ion-exchanged water, with stirring, to give 100 parts by weight of a polishing composition. When polishing, this polishing composition was diluted with 4-folds (vol/vol) of ion-exchanged water and used.

Formulation Method I-2

There were mixed together 16 parts by weight of an abrasive (α-alumina (alumina purity: about 99.9%) having primary average particle size: 0.1 μm, and secondary average particle size: 0.2 μm), 4 parts by weight of intermediate alumina (θ-alumina, average particle size: 0.2 μm, specific surface area: 150 m$^2$/g, alumina purity: about 99.9%), 0.5 parts by weight of itaconic acid, 3 parts by weight of citric acid, a given amount of a microwaviness reducing agent shown in Table 2, and balance ion-exchanged water, with stirring, to give 100 parts by weight of a polishing composition. When polishing, this polishing composition was diluted with 4-folds (vol/vol) of ion-exchanged water and used.

[Polishing Process]

A substrate surface made of an Ni-P plated aluminum alloy, the substrate surface having an average deviation, of all points from plane fit to test part surface Ra of 0.2 μm, as determined by Talystep commercially available from Rank Taylor-Hobson Limited (size of tip end of profilometer: 25 μm×25 μm, by-pass filter: 80 μm, measurement length: 0.64 mm), a microwaviness of 3.5 nm, a thickness of 1.27 mm and a diameter of 3.5 inches (diameter of 95.0 mm) was polished with the polishing composition prepared as described above using a double-sided processing machine under Set Conditions for Double-Sided Processing Machine for the first stage polishing given below, so as to adjust the amount polished on one side to 1.5 to 2 μm, to give an Ni-P plated, aluminum alloy substrate usable for a substrate for magnetic recording media.

Set Conditions for Double-Sided Processing Machine are as follows.

<Set Conditions for Double-Sided Processing Machine>

Double-sided processing machine: double-sided processing machine, Model 9B, manufactured by SPEEDFAM CO., LTD.

Processing pressure: 9.8 kPa

Polishing pad: "Bellatrix N0048 (trade name)" manufactured by Kanebo, LTD.

Disc rotational speed: 50 r/min

Feeding flow rate for a polishing composition: 100 ml/min

Polishing time period: 5 minutes

Number of substrates introduced: 10

[Conditions for Determining Average Deviation, of all Points from Plane Fit to Microwaviness Data (Wa)]

Each of the substrates after polishing were evaluated under the conditions given below.

| Device: | Zygo New-View 200 commercially available from Canon Sales, Inc. |
|---|---|
| Object Lens: | Magnification, 2.5 times, Micheison |
| Zooming Ratio: | 0.5 |
| Remove: | Cylinder |
| Filter type: | FFT Fixed Band Pass 0.5 to 5 mm |
| Area: | 4.33 mm × 5.77 mm |

The results in a case where the formulation method 1 was used are shown in Table 1. Each of the microwaviness data is expressed as a relative value when the microwaviness after polishing of Comparative Example I-1 is assumed to take a standard value of 1. It can be seen in Examples I-1 to I-6 where the microwaviness reducing agents of the present invention were added that the microwaviness is markedly reduced.

TABLE 1

| | Formulation Method | Microwaviness Reducing Agent (Parts by Weight) | | Microwaviness Relative Value |
|---|---|---|---|---|
| Ex. I-1 | I-1 | Copolymer of diisobutylene and maleic acid | 0.02 | 0.72 |
| Ex. I-2 | I-1 | Copolymer of diisobutylene and maleic acid | 0.04 | 0.69 |
| Ex. I-3 | I-1 | Copolymer of styrene and maleic acid | 0.02 | 0.74 |
| Ex. I-4 | I-1 | Copolymer of vinyl acetate and maleic acid | 0.02 | 0.74 |
| Ex. I-5 | I-1 | Potassium octadecenylsuccinate | 0.02 | 0.77 |
| Ex. I-6 | I-1 | Copolymer of acrylic acid and maleic acid | 0.02 | 0.77 |
| Comp. Ex. I-1 | I-1 | — | — | 1 |

In addition, the results in a case where the formulation method 2 was used are shown in Table 2. Each of the microwaviness data is expressed as a relative value when the microwaviness after polishing of Comparative Example I-2 is assumed to take a standard value of 1. It can be seen in Example I-7 where the microwaviness reducing agent of the present invention was added that the microwaviness is markedly reduced.

TABLE 2

| | Formulation Method | Microwaviness Reducing Agent (Parts by Weight) | | Microwaviness Relative Value |
|---|---|---|---|---|
| Ex. I-7 | I-2 | Copolymer of diisobutylene and maleic acid | 0.02 | 0.85 |
| Comp. Ex. I-2 | I-2 | — | — | 1 |

Examples II-1 to II-2 and Comparative Example II-1

[Method II-1 for Formulating Polishing Composition]

There were mixed together 16 parts by weight of an abrasive (α-alumina (purity: about 99.9%) having primary average particle size: 0.23 µm, and secondary average particle size: 0.8 µm), 4 parts by weight of intermediate alumina (θ-alumina, average particle size: 0.2 µm, specific surface area: 150 m²/g, purity: about 99.9%), 0.5 parts by weight of itaconic acid, 0.5 parts by weight of ammonium sulfate, 0.08 parts by weight of a surfactant "DEMOL EP" (commercially available from Kao Corporation), a given amount of a microwaviness reducing agent shown in Table 3, and balance ion-exchanged water, with stirring, to give 100 parts by weight of a polishing composition. When polishing, this polishing composition was diluted with 4-folds (vol/vol) of ion-exchanged water and used.

[Polishing Process]

A substrate surface made of an Ni-P plated aluminum alloy, the substrate surface having an average deviation, of all points from plane fit to test part surface Ra of 0.2 µm, as determined by Talystep commercially available from Rank Taylor-Hobson Limited (size of tip end of profilometer: 25 µm×25 µm, by-pass filter: 80 µm, measurement length: 0.64 mm), a thickness of 1.27 mm and a diameter of 3.5 inches (diameter of 95.0 mm) was polished with the polishing composition prepared as described above using a double-sided processing machine under Set Conditions for Double-Sided Processing Machine for the first stage polishing given below, so as to adjust the amount polished on one side to 1.5 to 2 µm, to give a polished finished product of a polished object of an Ni-P plated, aluminum alloy substrate usable for a substrate for magnetic recording media.

Set Conditions for Double-Sided Processing Machine are as follows.

<Set Conditions for Double-Sided Processing Machine>

First Stage Polishing

Double-sided processing machine: double-sided processing machine, Model 9B, manufactured by SPEEDFAM CO., LTD.

Processing pressure: 9.8 kPa

Polishing pad: "Bellatrix N0048" manufactured by Kanebo, LTD.

Disc rotational speed: 50 r/min

Feeding flow rate for a polishing composition: 100 ml/min

Polishing time period: 5 minutes

Number of substrates introduced: 10

[Microwaviness]

The microwaviness of the substrate after the polishing was determined under the same conditions as above.

The results are shown in Table 3. Each of the microwaviness data is expressed as a relative value when the microwaviness after polishing of Comparative Example II-1 is assumed to take a standard value of 1. It can be seen in Examples II-1 and II-2 where the microwaviness reducing agent of the present invention was added that the microwaviness is markedly reduced.

TABLE 3

| | Microwaviness Reducing Agent | (Parts by Weight) | Microwaviness Relative Value |
|---|---|---|---|
| Ex. II-1 | Citric acid | 3.00 | 0.74 |
| Ex. II-2 | Citric acid | 0.50 | 0.79 |
| Comp. Ex. II-1 | — | — | 1 |

Example II-3 and Comparative Example II-2

[Method II-2 for Formulating Polishing Composition]

There were mixed together 16 parts by weight of an abrasive (α-alumina (purity: about 99.9%) having primary average particle size: 0.23 µm, and secondary average particle size: 0.8 µm), 4 parts by weight of intermediate alumina (θ-alumina, average particle size: 0.2 µm, specific surface area: 150 m²/g, purity: about 99.9%), 0.5 parts by weight of itaconic acid, a given amount of a microwaviness reducing agent shown in Table 4, and balance ion-exchanged water, with stirring, to give 100 parts by weight of a polishing composition. The polishing was carried out in the same manner as in Example II-1 with each of the resulting polishing compositions. When polishing, this polishing composition was diluted with 4-folds (vol/vol) of ion-exchanged water and used.

The results are shown in Table 4. Each of the microwaviness data is expressed as a relative value when the microwaviness after polishing of Comparative Example II-2 is assumed to take a standard value of 1. It can be seen in Example II-3 where the microwaviness reducing agent of the present invention was added that the microwaviness is markedly reduced.

TABLE 4

|  | Microwaviness Reducing Agent (Parts by Weight) |  | Microwaviness Relative Value |
| --- | --- | --- | --- |
| Ex. II-3 | Citric acid | 3.00 | 0.85 |
| Comp. Ex. II-2 | — | — | 1 |

Examples III-1 to III-6 and Comparative Examples III-1 to III-4

[Method III-1 for Formulating Polishing Composition]

There were mixed together 16 parts by weight of an abrasive (α-alumina (purity: about 99.9%) having primary average particle size: 0.23 μm, and secondary average particle size: 0.65 μm), 4 parts by weight of intermediate alumina (θ-alumina, average particle size: 0.2 μm, specific surface area: 150 m²/g, purity: about 99.9%), 0.5 parts by weight of itaconic acid, given amounts of an organic acid and a surfactant listed in Table 5, and balance ion-exchanged water, with stirring, to give 100 parts by weight of a polishing composition. When polishing, this polishing composition was diluted with 4-folds (vol/vol) of ion-exchanged water and used.

[Polishing Process]

A substrate surface made of an Ni-P plated aluminum alloy, the substrate surface having an average deviation, of all points from plane fit to test part surface Ra of 0.2 μm, as determined by Talystep commercially available from Rank Taylor-Hobson Limited (size of tip end of profilometer: 25 μm×25 μm, by-pass filter: 80 μm, measurement length: 0.64 mm), a thickness of 1.27 mm and a diameter of 3.5 inches (diameter of 95.0 mm) was polished with the polishing composition prepared as described above using a double-sided processing machine under Set Conditions for Double-Sided Processing Machine given below, to give an Ni-P plated, aluminum alloy substrate usable for a substrate for magnetic recording media.

The waviness and the number of remaining nodules of the polished object were evaluated with the methods described below.

Set Conditions for Double-Sided Processing Machine are as follows.

<Set Conditions for Double-Sided Processing Machine>
Double-sided processing machine: double-sided processing machine, Model 9B, manufactured by SPEEDFAM CO., LTD.
Processing pressure: 9.8 kPa
Polishing pad: "H9900S" (trade name), manufactured by FUJI SPINNING Co., Ltd.
Disc rotational speed: 50 r/min
Feeding flow rate for a polishing composition: 100 ml/min
Polishing time period: 7 minutes, provided that only the evaluation of nodules: 1.5 minutes
Number of substrates introduced: 10

[Polishing Rate]

Weights of each substrate before and after polishing for 7 minutes were measured using a device commercially available from Sartorius under the trade name of BP-210S. Change in weight of each substrate was obtained, and an average of 10 substrates was referred to as an amount reduced, and a value obtained by dividing the amount reduced by the polishing time is referred to as a rate of weight reduced. The rate of weight reduced is introduced into the following equation and converted to a polishing rate (μm/min). A relative value of a polishing rate (relative rate) for each of Examples and Comparative Examples was obtained, assuming that the polishing rate of Comparative III-1 takes a standard value of 1.

Rate of Weight Reduced (g/min)=[Weight Before Polishing (g)−Weight After Polishing (g)]/Polishing Time (min)

Polishing Rate (μm/min)=Rate of Weight Reduced (g/min)/Area of One Side of Substrate (mm²)/Ni-P Plating Density (g/cm³)×10⁶

[Waviness]

The waviness of each substrate after 7 minutes of polishing was measured under the conditions mentioned below.

| Device: | Zygo New-View 200 commercially available from Canon Sales, Inc. |
| --- | --- |
| Object Lens: | Magnification, 2.5 times, Micheison |
| Zooming Ratio: | 0.5 |
| Remove: | Cylinder |
| Filter type: | FFT Fixed Band Pass |
| Short Wavelength: | 50 to 500 μm |
| Long Wavelength: | 0.5 to 5 mm |
| Area: | 4.33 mm × 5.77 mm |

[Nodule]

Each of the substrates after 1.5 minutes of polishing was observed under the following conditions, and the number of remaining nodules was counted.

| Device: | Polarized microscope (Nikon UFX-DX) |
| --- | --- |
| Magnification: | 300 times |
| Observation sites: | whole circumference of the disk at the center (between inner circumference and outer circumference) |

The results are shown in Table 5. Each of the polishing rates and the microwaviness data are expressed as a relative value when the value for Comparative Example III-1 is assumed to take a standard value of 1, and the number of remaining nodules is expressed by the count number. It can be seen in Examples III-1 to III-6 that the waviness and the number of remaining nodules are markedly reduced with maintaining their polishing rates, as compared to each of the cases of no addition of Comparative Example III-1, addition of the organic acid alone of Comparative Example II-2 and addition of the surfactant alone of Comparative Example III-3. Also, it can be seen from the comparison of Comparative Example III-2 with Comparative Example III-4 that the effects of reducing waviness and the number of remaining nodules are exhibited with the use of a polycarboxylic acid containing OH group or groups.

TABLE 5

|  | Organic Acid (Parts by Weight) | | Surfactant (Parts by Weight) | | Polishing Rate (Relative Value) | Waviness Short Wavelength (Relative Value) | Waviness Long Wavelength (Relative Value) | Number of Remaining Nodules (Relative Value) | pH |
|---|---|---|---|---|---|---|---|---|---|
| Ex. III-1 | Citric Acid | 3.0 | Copolymer of diisobutylene and maleic acid (MW 4000) | 0.02 | 1.05 | 0.52 | 0.58 | 2 | 2 |
| Ex. III-2 | Citric Acid | 3.0 | Copolymer of diisobutylene and maleic acid (MW 4000) | 0.04 | 1.01 | 0.51 | 0.58 | 0 | 2 |
| Ex. III-3 | Citric Acid | 3.0 | Copolymer of styrene and maleic acid (MW 4000) | 0.02 | 1.02 | 0.50 | 0.61 | 8 | 2 |
| Ex. III-4 | Citric Acid | 3.0 | Copolymer of vinyl acetate and maleic acid (MW 5000) | 0.02 | 1.00 | 0.50 | 0.61 | 5 | 2 |
| Ex. III-5 | Citric Acid | 3.0 | Potassium octadecenyl-succinic acid (MW 444) | 0.02 | 1.01 | 0.53 | 0.62 | 4 | 2 |
| Ex. III-6 | Citric Acid | 3.0 | Copolymer of acrylic acid and maleic acid (MW 6000) | 0.02 | 1.00 | 0.54 | 0.62 | 4 | 2 |
| Comp. Ex. III-1 | — | — | — | — | 1 | 1 | 1 | 17 | 3 |
| Comp. Ex. III-2 | Citric Acid | 3.0 | — | — | 1.02 | 0.88 | 0.88 | 12 | 2 |
| Comp. Ex. III-3 | — | — | Copolymer of diisobutylene and maleic acid (MW 4000) | 0.02 | 1.00 | 0.81 | 0.82 | 13 | 3 |
| Comp. Ex. III-4 | Glycolic Acid | 3.0 | — | — | 1.01 | 0.98 | 0.99 | 18 | 2 |

Since the microwaviness reducing agent of the present invention is used for polishing a substrate for a precision part or the like, there is exhibited an effect that a substrate having a large memory capacity per unit recording area can be manufactured.

In addition, since the polishing composition of the present invention is used for polishing a substrate for a precision part or the like, there is exhibited an effect that a fine waviness of the substrate and further the waviness and the number of remaining nodules can be reduced.

The present invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A polishing composition for a Ni-P plated substrate, comprising:
    water,
    an abrasive consisting essentially of alumina, wherein said alumina comprises α-alumina and θ-alumina,
    an organic acid comprising citric acid,
    a surfactant comprising diisobutylene-maleic acid copolymer and salts thereof, and
    a salt of a sulfur-containing inorganic acid comprising ammonium sulfate,
    wherein said alumina is contained in an amount of from 3 to 25% by weight of the polishing composition, said organic acid is contained in an amount of from 0.1 to 8% by weight of the polishing composition, said surfactant is contained in an amount of from 0.005 to 0.5% by weight of the polishing composition, and said salt of a sulfur-containing inorganic acid is contained in an amount of from 0.05 to 5% by weight of the polishing composition; and
    wherein said polishing composition has a pH of from 2 to 5.

2. A method of reducing waviness and/or nodules of a Ni-P plated substrate to be polished, comprising the step of polishing the substrate with the polishing composition as defined in claim 1.

3. A method for manufacturing a Ni-P plated substrate for a precision part, comprising the step of polishing a substrate with the polishing composition as defined in claim 1.

4. The polishing composition according to claim 1, wherein said α-alumina has an average secondary particle size of from 0.1 to 0.5 μm.

5. The polishing composition according to claim 1, wherein said organic acid is contained in an amount of from 0.1 to 3% by weight of the polishing composition.

* * * * *